CROSS REFERENCE EXAMINER

Aug. 21, 1962 L. F. BIRD 3,050,630

COMMUNICATION SYSTEM EMPLOYING A HIGH INTENSITY
ARC MODULATED LIGHT SOURCE

Filed April 23, 1959

INVENTOR.
LESTER F. BIRD
BY Karl Huber
James E. Bryan
Alan C. Rose
ATTORNEYS 3,050,630

COMMUNICATION SYSTEM EMPLOYING A HIGH INTENSITY ARC MODULATED LIGHT SOURCE

Lester F. Bird, Newark, N.J., assignor to Engelhard Hanovia, Inc., a corporation of New Jersey Filed Apr. 23, 1959, Ser. No. 808,328
2 Claims. (Cl. 250—199)

Figures 1A, 1B, 2:
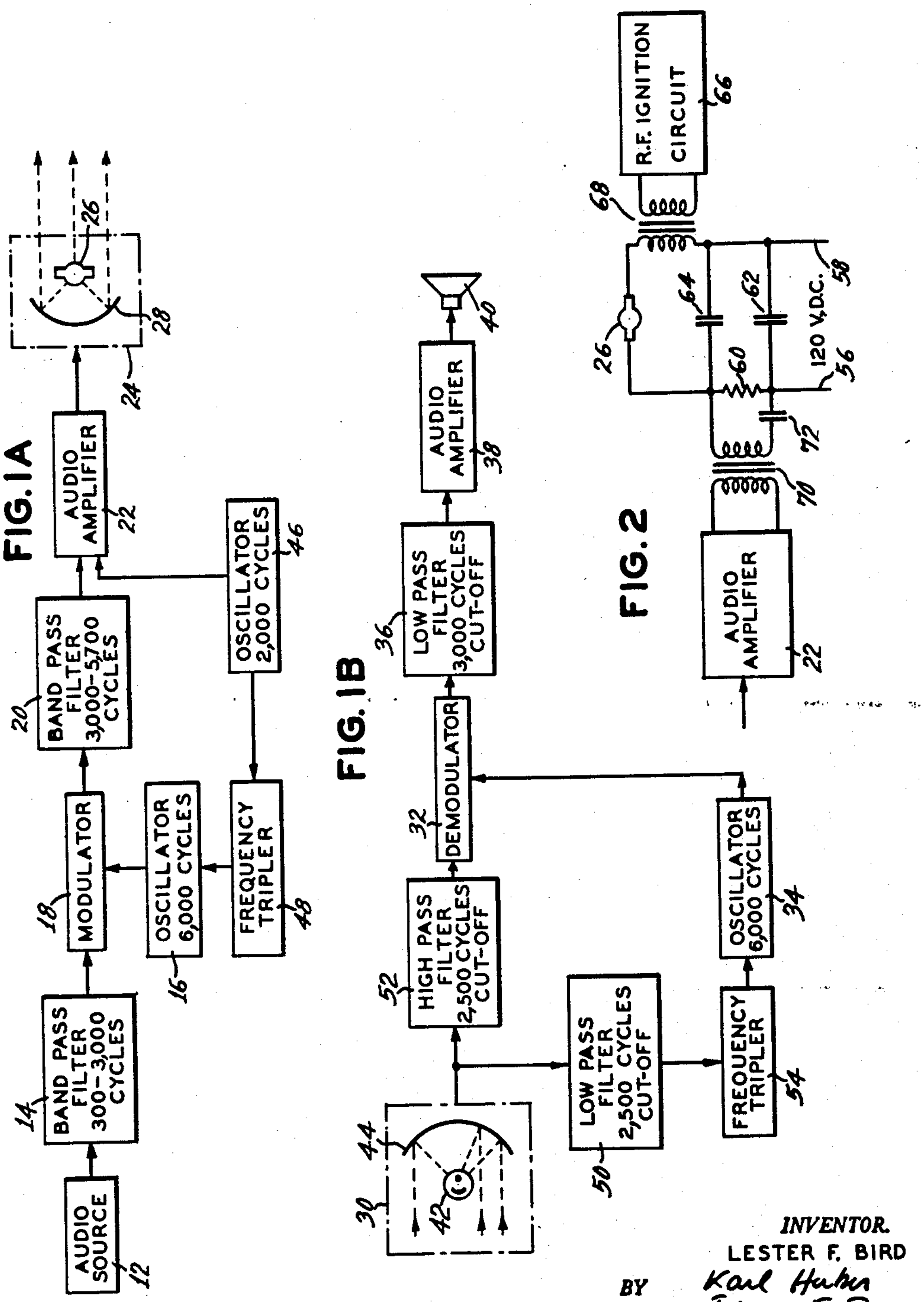

This invention relates to a communication system in which signals are transmitted over a light beam, and more particularly to such a system in which the signal information is transmitted in modulated form.

It has recently been determined that light communication systems are practical for distances up to five to ten miles point-to-point. In such systems high power xenon arc lamps may be employed. These communication systems have the secrecy advantage, in comparison with radio transmission systems, that the signals are not transmitted beyond direct line-of-sight distances.

While some element of secrecy is introduced by the limitation to line-of-sight distances, audio modulations on such a light beam may be readily detected by the simplest combination of a photocell and an electroacoustic transducer, such as a pair of earphones. Using the large gas tubes necessary for high light intensities, it has not been considered possible to transmit more than a very restricted band of frequencies. Accordingly, it has not been considered possible to use more refined techniques for improving the secrecy of the communication system.

An important object of the present invention is to increase the secrecy of light communication systems.

In accordance with the present invention, it has been discovered that inverted single side band modulation may be employed in light communication systems within the audio band to make transmitted light signals unintelligible. In one illustrative embodiment of the invention, audio signals having a band width of 300 to 3,000 cycles are employed to amplitude modulate a 6,000 cycle carrier. Following modulation, the carrier and the upper side band is suppressed. The lower side band, which has a frequency range of 3,000 to 5,700 cycles, is employed to modulate the arc lamp. When detected by simple photocell and electroacoustic transducer, such a signal sounds like high pitched gibberish. However, a properly designed receiver providing a suitable carrier and demodulation circuitry, in addition to a low pass filter and an electroacoustic transducer, readily deciphers the transmitted light signals.

In accordance with a feature of the invention, therefore, a light transmitting terminal includes a modulator, and circuitry for suppressing the carrier and one side band of the modulated signal; and the receiver includes circuitry for reinserting the carrier signal and for detecting the original audio signals.

The present system provides the secrecy advantage of employing modulated light beam signals which are unintelligible to the casual interceptor. Furthermore, the use of the lower side band has the combined advantage of increasing the difficulty of reconstituting the original signals and of maintaining the transmitted signals within the preferred transmission band of high power arc lamps.

Other objects, features and advantages of the invention will become apparent from a consideration of the following description, and from the drawings in which, FIGURE 1A is a block diagram of a light transmitting terminal in accordance with the invention;

FIGURE 1B is a block diagram of a receiving terminal in accordance with the invention; and FIGURE 2 is a more detailed circuit diagram of the modulation circuitry which may be employed in the circuit of FIGURE 1A.

With reference to the drawings, FIGURE 1A includes a source of audio signals 12 and a band pass filter 14 to limit the audio signals to a frequency range extending from 300 to 3,000 cycles. Signals from a 6,000 cycle oscillator 16 are combined with signals from filter 14 in the modulation circuit 18. The output signals from the modulator 18 include the carrier frequency of 6,000 cycles, an upper side band extending from 6,300 to 9,000 cycles, and a lower side band extending from 3,000 to 5,700 cycles. The carrier, the upper side band, and any possible audio signals are eliminated by the band pass filter 20. The remaining signals in the 3,000 to 5,700 cycle range are amplified by the audio amplifier 22 and applied to modulate the high intensity arc lamp 24. The arc lamp assembly 24 includes a one kilowatt xenon lamp 26 and a suitable parabolic reflector 28 for collimating the light from lamp 26.

The receiving terminal of FIGURE 1B includes the photocell assembly 30, the demodulator 32, an oscillator 34, a low pass filter 36 coupled to the output from the demodulator 32, an audio amplifier 38, and a speaker 40. The photocell assembly at the receiver may suitably include a photocell 42 and a parabolic reflector 44 for focusing incident light from lamp assembly 24 onto the photocell 42. When the signals from the oscillator 34 are combined with the signals picked up by the photocell assembly 30 in the demodulator 32, audio signals are again developed. In addition, the output from the demodulator 32 also includes signals at the 6,000 cycle frequency of the oscillator 34 and sum frequencies in the range of 9,000 to 11,700 cycles. The extraneous signals are eliminated by the low pass filter 36, and the remaining audio signals are amplified by the audio amplifier 38 and applied to the electroacoustic transducer 40.

If desired, a signal source 46 of, for example, 2,000 cycles may be employed at the transmitter of FIGURE 1A. By the use of a frequency tripler circuit 48, the 2,000 cycle signal may be employed to synchronize the 6,000 cycle oscillator 16. The 2,000 cycle signal may also be applied directly to the input of audio amplifier 22 in parallel with signals from the filter 20.

At the receiver, signals from the photocell assembly 30 may be applied to the low pass filter 50 and the high pass filter 52 rather than directly to the demodulator 32. The 2,000 cycle signals from the oscillator 46 are transmitted by filter 50 to the frequency tripler 54. From the frequency tripler 54, 6,000 cycle signals are applied to synchronize the oscillator 34. With this arrangement, exact correspondence between the audio output signals provided by speaker 40 and the original audio input signals of the source 12 are insured. With normal voice communication however, such exact correspondence is not necessary, and a simple local oscillator 34 may be used. Under these circumstances, the circuit components designated 46 and 48 in FIGURE 1A and those designated 50, 52 and 54 in FIGURE 1B may be eliminated.

One suitable circuit for modulating a high power arc lamp is shown in FIGURE 2. In FIGURE 2 the energization circuit for the arc lamp 26 includes leads 56 and 58, which are connected to a source of 120 volt direct current. In addition, a ballast resistor 60, a large electrolytic capacitor 62 and a small radio frequency capacitor 64 are provided. A suitable radio frequency ignition circuit 66 is coupled by a light duty transformer 68 to the local series ignition circuit of the arc lamp 26 which includes the capacitor 64. The capacitor 64 has the relatively small value of .002 microfarad so that it is operative in the series radio frequency ignition operation but does not interfere with the audio modulation.

Output signals from audio amplifier 22 of FIGURE 1A are applied by the audio transformer 70 and the large electrolytic capacitor 72 to the lamp circuit. When the lamp 26 is ignited, it has a resistance of about one ohm, as compared with the resistance of about three ohms of the ballast resistor 60. Audio signals applied to the transformer 70 are therefore coupled to the arc lamp by the series circuit including transformer 70 and the two electrolytic capacitors 72 and 62. By way of example, the electrolytic capacitor 62 may have a value of about 2,000 microfarads, and the capacitor 72 may have a value of about 1,000 microfarads.

It is to be understood that the above described arrangements are illustrative of the application of the principles of the invention. Numerous other arrangements may be devised by those skilled in the art without departing from the spirit and scope of the invention.

What is claimed is:

1. In a light communication system, a source of audio signals, means for limiting the frequencies of said audio signals, an audio frequency carrier oscillator having a higher frequency than the limited audio signals, modulation means for combining the audio signals and signals from said oscillator to produce output signals having a carrier and upper and lower side bands, means for suppressing said carrier and said upper side bands, a high intensity arc lamp, means for applying the lower side band signals to modulate said high intensity lamp, photosensitive means for detecting said transmitted signals, a second oscillator having about the same frequency as said first oscillator, and a demodulator for combining signals from said photosensitive means and said second oscillator to reconstitute the audio signals.

2. In a light communication system, a source of audio signals, means for limiting said audio signals below a predetermined frequency, a first oscillator having a frequency which is at least twice as high as said predetermined frequency, modulation means for combining the limited audio signals and the signals from said oscillator to produce output signals having a carrier and upper and lower side bands, means for suppressing said carrier and said upper side band, a synchronizing oscillator having a frequency less than said predetermined frequency coupled to said first oscillator to control its frequency, a high intensity arc lamp, means for applying the lower side band signals and signals from said synchronizing oscillator to modulate said lamp, photosensitive means for detecting said transmitted signals, a third oscillator responsive to the received synchronization signals to provide exactly the same frequency as said first oscillator, and demodulation means for combining the lower side band signals detected by said photosensitive means and signals from said third oscillator to reconstitute the frequency limited audio signals.

References Cited in the file of this patent

UNITED STATES PATENTS

| | | |
|---|---|---|
| 2,161,406 | Charrier | June 6, 1939 |
| 2,273,023 | De Belliscize | Feb. 17, 1942 |
| 2,557,974 | Kibler | June 26, 1951 |
| 2,858,421 | Touvet | Oct. 28, 1958 |
| 2,970,310 | Bruce | Jan. 31, 1961 |